(12) United States Patent
Choksi

(10) Patent No.: US 7,212,627 B2
(45) Date of Patent: May 1, 2007

(54) LINE INTERFACE WITH ANALOG ECHO CANCELLATION

(75) Inventor: Ojas M. Choksi, Monmouth Junction, NJ (US)

(73) Assignee: Analog Devices, Inc., Norwood, MA (US)

( * ) Notice: Subject to any disclaimer, the term of this patent is extended or adjusted under 35 U.S.C. 154(b) by 195 days.

(21) Appl. No.: 10/946,050

(22) Filed: Sep. 21, 2004

(65) Prior Publication Data

US 2006/0062378 A1    Mar. 23, 2006

(51) Int. Cl.
 *H04M 1/00* (2006.01)
 *H04M 9/00* (2006.01)
(52) U.S. Cl. .................. 379/390.04; 379/394; 379/398; 379/402
(58) Field of Classification Search ............ 379/390.04
 See application file for complete search history.

(56) References Cited

U.S. PATENT DOCUMENTS

| | | | |
|---|---|---|---|
| 3,778,730 A * | 12/1973 | Cromwell et al. ........... 331/109 |
| 5,274,704 A * | 12/1993 | Jakab .......................... 379/403 |
| 5,822,426 A | 10/1998 | Rasmus et al. .............. 379/402 |
| 5,877,637 A | 3/1999 | Trofimenkoff et al. ...... 327/101 |
| 5,909,132 A | 6/1999 | Trofimenkoff et al. ...... 327/101 |
| 6,163,579 A | 12/2000 | Harrington et al. .......... 375/257 |
| 6,212,263 B1 * | 4/2001 | Sun et al. ................. 379/93.28 |
| 6,563,445 B1 | 5/2003 | Sabouri ...................... 341/120 |
| 6,731,166 B1 * | 5/2004 | Sabouri et al. ......... 330/124 R |
| 6,774,723 B2 | 8/2004 | Sabouri ....................... 330/288 |
| 6,826,278 B2 * | 11/2004 | Kiykioglu ............... 379/399.01 |
| 6,925,172 B2 | 8/2005 | Sabouri et al. ......... 379/399.01 |
| 6,931,122 B2 | 8/2005 | Sabouri et al. .............. 379/402 |
| 6,999,743 B2 | 2/2006 | Sabouri et al. .............. 455/307 |
| 7,015,683 B1 | 3/2006 | Choksi et al. ............... 323/313 |
| 7,072,617 B1 | 7/2006 | Gupta et al. ................... 455/63 |
| 2002/0121930 A1 | 9/2002 | Gorcea ......................... 330/75 |
| 2002/0126835 A1 | 9/2002 | Joffe ...................... 379/406.01 |
| 2002/0151280 A1 * | 10/2002 | Sabouri et al. ................ 455/80 |
| 2002/0176569 A1 | 11/2002 | Casier et al. ................ 379/402 |
| 2003/0109239 A1 | 6/2003 | Sabouri et al. .............. 455/307 |
| 2003/0174660 A1 | 9/2003 | Blon et al. ................... 370/286 |

* cited by examiner

*Primary Examiner*—Fan Tsang
*Assistant Examiner*—Ramnandan Singh
(74) *Attorney, Agent, or Firm*—Bromberg & Sunstein LLP

(57) ABSTRACT

A line interface performs echo cancellation without the use of a hybrid filter network and includes a transmit path having a line driver, a single matching network terminating the line, and a single transformer. The transformer uses split windings on both the primary side and the secondary (line) side. Each half of the primary side is tapped to obtain a turns ratio of N1:N2, while each half of the secondary side of the transformer has N windings. The single matching impedance is coupled in parallel between the first winding and the second winding on each half of the primary side. Either the voltage across the matching impedance or the voltage across the receive terminals is bootstrapped to the receive signal through multiple negative feedbacks. The transfer function of the line driver is shaped as a first-order high-pass filter (HPF) to reject any out-of-band noise and distortion components.

18 Claims, 5 Drawing Sheets

LINE INTERFACE WITH ANALOG ECHO CANCELLATION

FIELD OF THE INVENTION

The present invention relates generally to communication systems, and more particularly to a line interface with analog echo cancellation, for example, for use in a communication device such as a digital subscriber line modem.

BACKGROUND OF THE INVENTION

Certain communication devices transmit and receive signals over a communication medium, such as a telephone or cable line. These communication devices typically include a transmitter and a receiver (sometimes referred to collectively as a transceiver) coupled to the communication medium through a line interface. Among other things, the line interface generally acts as the electrical interface between the transceiver and the line.

In some communication devices, transmitted signals can be leaked or reflected back to the receiver so as to constitute part of the received signals. For convenience, these reflected signals are often referred to as "echoes." Similar to a person's voice echoing off of a canyon wall, the echoes in the received signals are generally at a lower power level or intensity than the originally transmitted signals, and there can be multiple echoes corresponding to a single transmitted signal that arrive at the receiver at different times.

The presence of transmit signal echoes in the received signals can limit the dynamic range of the receiver. Therefore, it is preferable to remove, attenuate, or otherwise compensate for the transmit signal echoes in the received signals. Echo cancellation is customarily done by subtracting the transmit amplifier output voltage from the voltage across a matching impedance using complex circuitry such as a hybrid filter network. Among other things, hybrid filter networks are typically expensive in terms of the number of external components, cost, power usage, and printed circuit board (PCB) area.

Some line interface architectures are described in the following references, all of which are hereby incorporated herein by reference in their entireties:

[1] T. M. Rasmus and W. Sylivant, "Balanced Hybrid Circuit," U.S. Pat. No. 5,822,426, Oct. 13, 1998.

[2] B. Harrington and S. Wurcer, "Broadband Modem Transformer Hybrid," U.S. Pat. No. 6,163,579, Dec. 19, 2000.

[3] D. V. Gorcea, "Combined Active Impedance and Filter in Line Drivers," U.S. Patent Application US 2002/0121930 A1, Sep. 5, 2002.

[4] D. M. Joffe, "Method and Apparatus for an Improved Analog Echo Canceller," U.S. Patent Application US 2002/0126835 A1, Sep. 12, 2002.

[5] F. Sabouri, J. P. Guido and J. G. Kenney Jr., "Line Interface with Gain Feedback Coupled Matching Impedance," U.S. Patent Application US 2002/0151280 A 1, Oct. 17, 2002.

[6] H. J. Casier et al, "Hybrid Circuit for a Broadband Modem," U.S. Patent Application US 2002/0176569 A1, Nov. 28, 2002.

[7] F. Sabouri and J. P. Guido, "Line Interface with Second Order High Pass Transfer Function," U.S. Patent Application US 2003/0109239 A1, Jun. 12, 2003.

[8] T. Blon et al, "Circuit Arrangement for the Analogue Suppression of Echos", U.S. Patent Application US 2003/0174660 A1, Sep. 18, 2003.

SUMMARY OF THE INVENTION

Disclosed herein are various line interface architectures with analog echo cancellation for a communication device such as a digital subscriber line (DSL) modem. These line interface architectures accomplish echo cancellation without the use of a hybrid filter network, and so the line interface can generally be implemented with fewer external components such as costly, bulky capacitors that are normally used in other line interface architectures to achieve similar performance. Echo cancellation is performed before the signal is input to the receive amplifier, so these architectures generally save two input pins to the receive amplifier. The line interface is preferably balanced, and so the common-mode noise is greatly attenuated. Thus, line interface embodiments of the present invention typically cost less, consume less power, and take up less printed circuit board (PCB) area than other line interface architectures without sacrificing performance in terms of transmit gain, receive gain, hybrid rejection, line termination, and noise.

In accordance with embodiments of the present invention, the line interface includes a transmit path and a receive path coupled to a communication medium (line) such as a telephone line. The transmit path includes a line driver, a single matching network terminating the line, and a single transformer. The arrangement comprising the line driver, the matching impedance, and the transformer performs echo cancellation by substantially preventing the transmit signal echo from leaking into the receive path, which, otherwise, limits the dynamic range.

The line driver architectures provide an output impedance matched to the line and achieve high-efficiency operation. They can be implemented in single-ended or fully-differential architectures and can be used with voltage-or current-feedback amplifiers. Even when used as a fully-differential amplifier, they require only a single matching impedance, leading to a significant space saving on the printed circuit board. The matching impedance is typically ten percent of the line characteristic impedance.

In typical embodiments, the single transformer uses split windings on both the primary side and the secondary (line) side. On the primary side of the transformer, each half of the primary side is tapped to obtain a turns ratio of N1:N2, while each half of the secondary side of the transformer has N windings. In a typical implementation, a normal split winding transformer with a split ratio of 1:1 on the primary side is further split in each half primary winding and tapped such that each half primary winding is further divided into two windings with a turns ratio of N1:N2. Such a transformer generally requires two additional pins on the primary side of the transformer for tapping the windings. The split ratio between windings has to be accurately controlled for balanced topology and optimum performance. The single matching impedance is coupled in parallel between the first (N1) winding and the second (N2) winding on each half of the primary side.

In various embodiments, either the voltage across the matching impedance or the voltage across the receive terminals is bootstrapped to the receive signal through multiple negative feedbacks so that the terminating impedance appears much larger than its actual value from the point of view of the receiver. The matching impedance, on the other hand, manifests itself as a small impedance to the transmit signal and as a result, dissipates only a small fraction of the transmit power. The transfer function of the line driver is shaped as a first-order high-pass filter (HPF) to reject any out-of-band noise and distortion components. The receive path typically consists of just a low noise programmable-gain receive amplifier, since the hybrid rejection is already achieved by the arrangement of transformer, line driver, and the matching impedance.

Thus, in accordance with one aspect of the invention, there is provided a line interface for use in a transceiver system. The line interface includes a hybrid circuit including a single transformer and a single matching circuit. The transformer is couplable on a primary side to a transmit amplifier and to a receive amplifier and is couplable on a secondary side to a communication medium. Each side of the transformer has split windings. Each half of the primary side is further split into a first winding having a first number of turns and a second winding having a second number of turns. The first winding and the second winding are coupled in series on each half of the primary side. The single matching circuit has a matching impedance significantly less than a line impedance and is coupled in parallel between the first windings and the second windings on each half of the primary side. The line interface also includes a multiple negative-feedback network for causing the matching impedance to appear much larger than its actual value as seen by the communication medium on the secondary side and to appear with substantially its actual value at the output of the transmit amplifier.

The matching circuit may include a first resistor coupled in parallel with a second resistor and a capacitor coupled serially. The voltage across the matching impedance may be bootstrapped to a receive signal through the multiple negative-feedback network. Alternatively, receive terminals of the transformer may be bootstrapped to the receive signal through the multiple negative-feedback network. The multiple negative-feedback network may be a dual negative-feedback network. The dual negative-feedback network may include a first feedback loop in which the outputs of the transmit amplifier are fed back to the inputs of the transmit amplifier through a first pair of resistors and a second feedback loop in which one of (a) a voltage across the matching impedance and (b) a voltage across receive terminals of the transformer is bootstrapped through a second pair of resistors around the transmit amplifier. Typically, the matching impedance (ZM) is substantially equal to:

$$Z_M = \left(\frac{N_1 N_2}{N^2}\right) Z_L$$

where ZL is the line impedance, N1 is the first number of turns on the first primary side windings, N2 is the second number of turns on the second primary side windings, and N is the number of turns on each half of the secondary side windings. The transmit amplifier and/or the receive amplifier may include differential inputs, and each of the differential inputs of a differential transmit amplifier may include a high-pass filtering capacitor.

In accordance with another aspect of the invention, there is provided a transceiver system having transmit circuit including a transmit amplifier having differential inputs and differential outputs, a receive circuit including a receive amplifier having differential inputs and differential outputs, and a hybrid circuit coupled to the differential outputs of the transmit circuit and to the differential inputs of the receive circuit. The hybrid circuit includes a single transformer and a single matching circuit. The transformer is couplable on a primary side to a transmit amplifier and to a receive amplifier and is couplable on a secondary side to a communication medium. Each side of the transformer has split windings. Each half of the primary side is further split into a first winding having a first number of turns and a second winding having a second number of turns. The first winding and the second winding are coupled in series on each half of the primary side. The single matching circuit has a matching impedance significantly less than a line impedance and is coupled in parallel between the first windings and the second windings on each half of the primary side. The transceiver system also includes a multiple negative-feedback network for causing the matching impedance to appear much larger than its actual value as seen by the communication medium on the secondary side and to appear with substantially its actual value at the output of the transmit amplifier.

The matching circuit may include a first resistor coupled in parallel with a second resistor and a capacitor coupled serially. The voltage across the matching impedance may be bootstrapped to a receive signal through the multiple negative-feedback network. Alternatively, receive terminals of the transformer may be bootstrapped to the receive signal through the multiple negative-feedback network. The multiple negative-feedback network may be a dual negative-feedback network. The dual negative-feedback network may include a first feedback loop in which the outputs of the transmit amplifier are fed back to the inputs of the transmit amplifier through a first pair of resistors and a second feedback loop in which one of (a) a voltage across the matching impedance and (b) a voltage across receive terminals of the transformer is bootstrapped through a second pair of resistors around the transmit amplifier. Typically, the matching impedance (ZM) is substantially equal to:

$$Z_M = \left(\frac{N_1 N_2}{N^2}\right) Z_L$$

where ZL is the line impedance, N1 is the first number of turns on the first primary side windings, N2 is the second number of turns on the second primary side windings, and N is the number of turns on each half of the secondary side windings. Each of the differential inputs of the differential transmit amplifier may include a high-pass filtering capacitor.

DETAILED DESCRIPTION OF A PREFERRED EMBODIMENT

Figure 1:
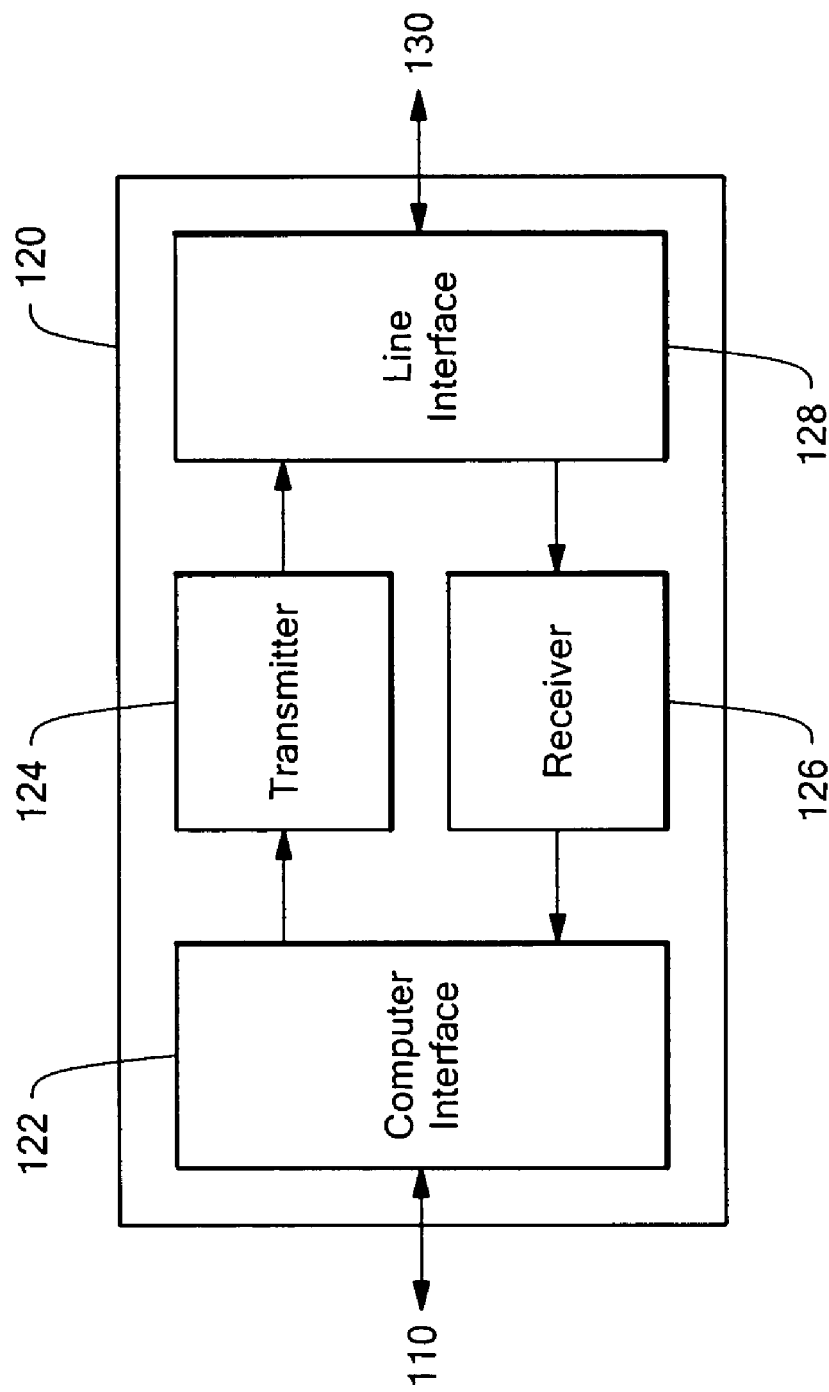
FIG. 1 is a high-level block diagram showing the relevant components of an ADSL modem in accordance with an embodiment of the present invention.

In accordance with various embodiments of the present invention, a line interface, such as a line interface for a DSL modem, performs analog echo cancellation without the use of a hybrid filter network. Echo cancellation is performed before the signal is input to the receive amplifier. The line interface is preferably balanced, and so the common-mode noise is greatly attenuated.

The line interface typically includes a transmit path and a receive path coupled to a communication medium (line) such as a telephone line. The transmit path includes a line driver, a single matching network terminating the line, and a single transformer. The arrangement comprising the line driver, the matching impedance, and the transformer performs echo cancellation by substantially preventing the transmit signal echo from leaking into the receive path, which, otherwise, limits the dynamic range.

Exemplary line driver architectures provide an output impedance matched to the line and achieve high-efficiency operation. They can be implemented in single-ended or fully-differential architectures and can be used with voltage- or current-feedback amplifiers. Even when used as a fully-differential amplifier, they require only a single matching impedance, leading to a significant space saving on the printed circuit board. The matching impedance is typically ten percent of the line characteristic impedance.

In typical embodiments, the single transformer uses split windings on both the primary side and the secondary (line) side. On the primary side of the transformer, each half of the primary side is tapped to obtain a turns ratio of N1:N2, while each half of the secondary side of the transformer has N windings. In a typical implementation, a normal split winding transformer with a split ratio of 1:1 on the primary side is further split in each half primary winding and tapped such that each half primary winding is further divided into two windings with a turns ratio of N1:N2. Such a transformer generally requires two additional pins on the primary side of the transformer for tapping the windings. The split ratio between windings has to be accurately controlled for balanced topology and optimum performance. The single matching impedance is coupled in parallel between the first (N1) winding and the second (N2) winding on each half of the primary side.

In various embodiments, either the voltage across the matching impedance or the voltage across the receive terminals is bootstrapped to the receive signal through multiple negative feedbacks so that the terminating impedance appears much larger than its actual value from the point of view of the receiver. The matching impedance, on the other hand, manifests itself as a small impedance to the transmit signal and as a result, dissipates only a small fraction of the transmit power. The transfer function of the line driver is shaped as a first-order high-pass filter (HPF) to reject any out-of-band noise and distortion components. The receive path typically consists of just a low noise programmable-gain receive amplifier, since the hybrid rejection is already achieved by the arrangement of transformer, line driver, and the matching impedance.

Exemplary embodiments of the invention are described below with reference to a full-rate asymmetric digital subscriber line (ADSL) modem for central office (CO) applications. It should be noted, however, that the exemplary architectures can be applied to other applications by appropriate modifications.

FIG. 1 is a high-level block diagram showing the relevant components of an ADSL modem 120 in accordance with an embodiment of the present invention. Among other things, the ADSL modem 120 includes a computer interface 122, a transmitter 124, a receiver 126, and a line interface 128. The computer interface 122 allows for intercommunication with a computer 110, for example, through a USB interface, an Ethernet interface, or a PCI bus. The line interface 128 allows for intercommunication with a communication medium (line) 130, such as a telephone line. The transmitter 124 processes signals received from the computer interface 122 (e.g., for transmission over the communication medium 130 via the line interface 128), and typically performs such functions as framing, cyclic redundancy check (CRC) computation, scrambling, forward error correction (FEC) encoding, interleaving, Viterbi encoding, modulation, digital filtering, and digital-to-analog conversion, among others. The receiver 126 processes signals received from the line interface 128 (e.g., for transmission to the computer 110 via the computer interface 122), and typically performs such functions as analog-to-digital conversion, digital filtering, demodulation, Viterbi decoding, de-interleaving, FEC decoding, descrambling, CRC computation and verification, and framing, among others. The line interface 128 couples the transmitter 124 and the receiver 126 to the communication medium 130, and typically performs such functions as analog filtering, transmit signal amplification, receive signal amplification, and echo cancellation, among others.

Figure 2:
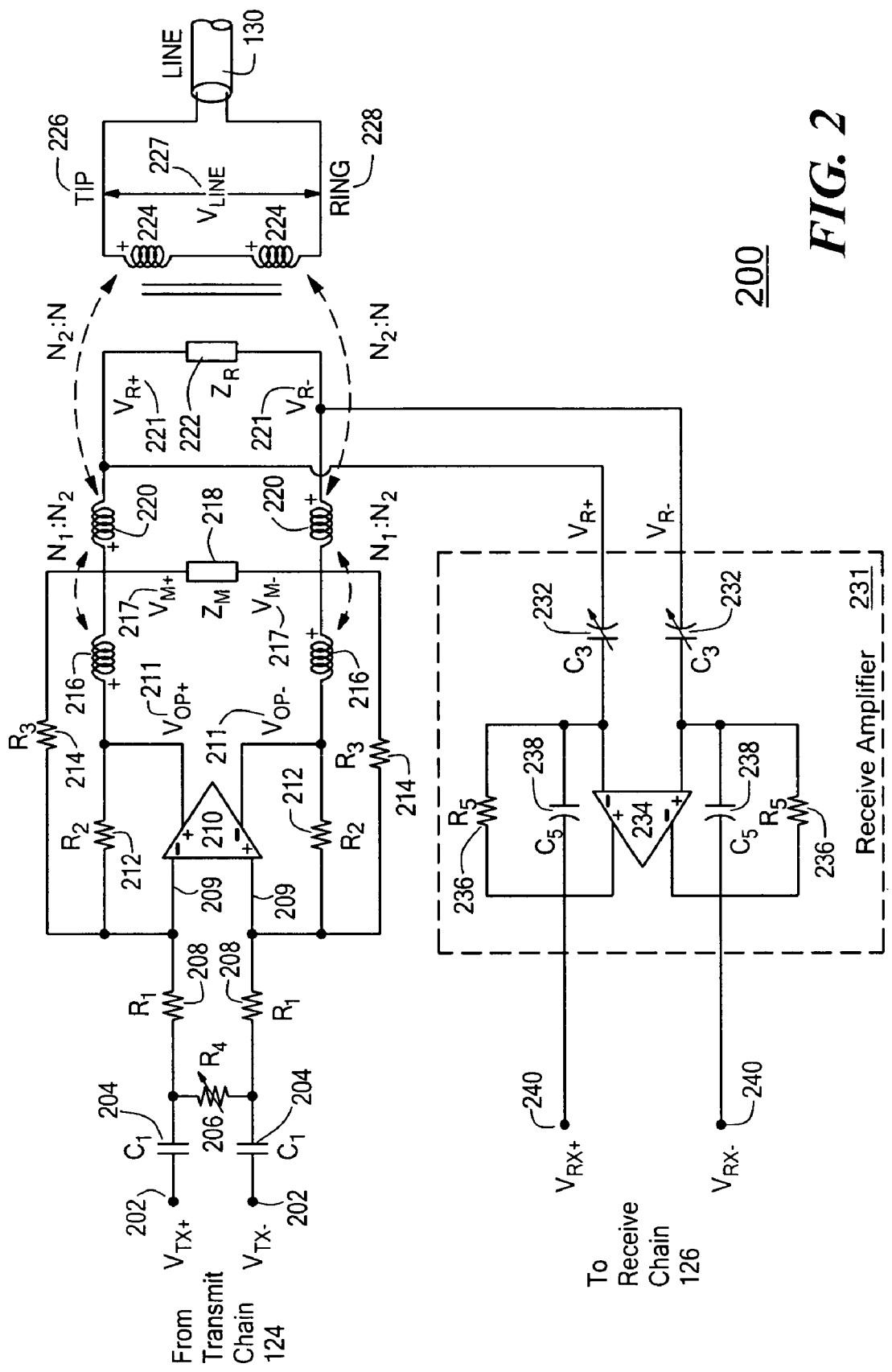
FIG. 2 is a schematic diagram showing a exemplary line interface architecture for an ADSL modem front end in accordance with a first embodiment of the present invention.

FIG. 2 is a schematic diagram showing an exemplary line interface architecture 200 for an ADSL modem front end in accordance with a first embodiment of the present invention. The line interface 200 uses a fully-differential voltage-feedback implementation of a line driver, a single-transformer hybrid, a single matching impedance, and a receive path amplifier. The transformer uses split windings on both the primary side (i.e., the side coupled to the transmitter 124 and the receiver 126) and the secondary side (i.e., the side coupled to the line 130). On the primary side of the transformer, each half of the primary side is tapped to obtain a turns ratio of N1:N2, while each half of the secondary side of the transformer has N windings. A dual negative-feedback network (described below) boosts the small-signal impedance of the matching network 218 (ZM) to a much larger line driver output impedance in order to match the characteristic impedance of the transmission line (ZL). Matched termination of the line improves transmission efficiency for the received signal. While the matching impedance manifests itself significantly larger to the received signal, it appears substantially with its actual value for the transmit signal. As a result, by using a small matching impedance, only a small fraction of the total power is consumed by the matching impedance and an efficient operation is achieved during transmission.

The transmission path includes a pair of capacitors 204 (C1), a variable resistor 206 (R4), and a pair of resistors 208 (R1) in the input path from line interface inputs 202 (VTX) to a transmitter amplifier 210. The outputs 211 (VOP) of the transmitter amplifier 210 are fed back to the inputs 209 through a pair of resistors 212 (R2) to form a first feedback path and are also coupled to the primary side of the transformer, which is split into first primary windings 216 having N1 turns and second primary windings 220 having N2 turns. The matching network 218 is coupled in parallel with the outputs 211 of the transmitter amplifier 210 between the first primary windings 216 and the second primary windings 220. The outputs 211 (VOP) of the amplifier 210 are serially passed through the first primary side transformer windings 216, and the voltage across the matching impedance 218 (ZM) is bootstrapped through the resistors 214 (R3) at nodes 217 (VM+ and VM−) to form a second feedback path.

Resistors 208 (R1), 212 (R2), and 214 (R3) set the gains from the inputs 202 (VTX) to the outputs 211 (VOP) of the amplifier 210 and also to the voltage 227 (VLINE) across the conductors 226 (TIP) and 228 (RING) of line 130. The received signals 221 (VR+ and VR−) from the line appear across the transformer primary windings 216 (N1) and 220 (N2). In addition, the transmit signal appears across the same windings. When the impedance (ZM) of the matching network 218 is a fraction of the impedance (ZL) of the line 130, the sum of the transmit voltage across the two windings 220 (N2) becomes equal to that across the matching impedance (ZM). This results in a substantially complete rejection of the echo signal when the receive voltage is taken from terminals 221 (VR+ and VR−). Thus, a substantially complete rejection is achieved in the hybrid without the need of extra components that are otherwise needed to perform this function. The capacitors 204 (C1) implement a first-order high-pass filter (HPF) essentially at no additional cost, noise, or power consumption.

The receive path of the line interface consists of a receive amplifier 231 coupled to terminals 221 (VR+ and VR−) of the second primary windings 220. The receive amplifier drives outputs 240 (VRX) and includes a pair of variable capacitors 232 (C3), difference amplifier 234, a pair of resistors 236 (R5), and another pair of capacitors 238 (C5). This is just one example of a receive amplifier. The present invention is not limited to this implementation of a receive amplifier, and other implementations can be used.

For optimal hybrid rejection of the transmit signal echo from the receive path, the matching impedance 218 (ZM) should be:

$$Z_M = \left(\frac{N_1 N_2}{N^2}\right) Z_L \quad (1)$$

where ZL is the line impedance seen on the conductors 226 (TIP) and 228 (RING), and resistance 214 (R3) is substantially greater than the matching impedance 218 (ZM). It can be shown that the transmit gain to the line is maximized when Eq. (1) is satisfied. Further, the receive gain from the line is maximized when the receive impedance 222 (ZR) is infinite.

Under these conditions, voltage gain from line driver inputs 202 (VTX) to the transmitter outputs 211 (VOP) can be approximated as:

$$\frac{V_{OP}}{V_{TX}} = \frac{-\left(\frac{R_2}{R_1}\right)}{\left[1 + \left(\frac{N_2}{N_1+N_2}\right)\left(\frac{R_2}{R_3}\right)\right]} \quad (2)$$

Voltage gain from line driver input to the line 130 can be approximated as:

$$\frac{V_{LINE}}{V_{TX}} = \left(\frac{N}{N_1+N_2}\right)\frac{V_{OP}}{V_{TX}} \quad (3)$$

Receive path gain can be approximated as:

$$\frac{V_R}{V_{LINE}} = -\left(\frac{2N_2}{N}\right) \quad (4)$$

Output impedance of the line driver seen from the line can be approximated as:

$$Z_l = \left(\frac{N}{N_1}\right)^2 \left(1 + \frac{R_2}{R_3}\right) Z_M \quad (5)$$

In order to match the output impedance of the line driver (expressed by Eq. (5)) to the line characteristic impedance (ZL), the following condition should be met:

$$\frac{R_2}{R_3} = \left[\left(\frac{N_1}{N_2}\right) - 1\right] \quad (6)$$

When a finite ZR is used, the conditions on the value of ZR in order to match the output impedance of the line driver to the characteristic impedance of the line and in order to have the ratio of (R2/R3) positive is:

$$Z_R > \left[\frac{(N_1+N_2)N_2}{N^2}\right] Z_L \quad (7)$$

The power saving factor k (i.e., the ratio of the matching impedance to the line characteristic impedance) can be approximated as:

$$k = Z_M / Z_L = \frac{N_1 N_2}{N^2} \quad (8)$$

where ZL is the total line impedance as seen from the secondary side of the transformer. In the above equation, N represents the number of turns of each secondary as shown in FIG. 2. The impedance of the matching network is preferably optimized to match the characteristic impedance of the line times a scaling factor as shown in Eq. (8) above.

Unfortunately, the characteristic impedance of many transmission lines are not well defined. For example, with a twisted-pair telephony transmission line, the characteristic impedance may vary depending on the wire gauge, the length of the line, and the number of bridge taps. Realization of an impedance network with perfect matching to all the lines is practically impossible. In order to achieve reasonable transmit signal rejection from the receive path, the voltage across the matching impedance can be filtered as shown in FIG. 2.

Figure 3:
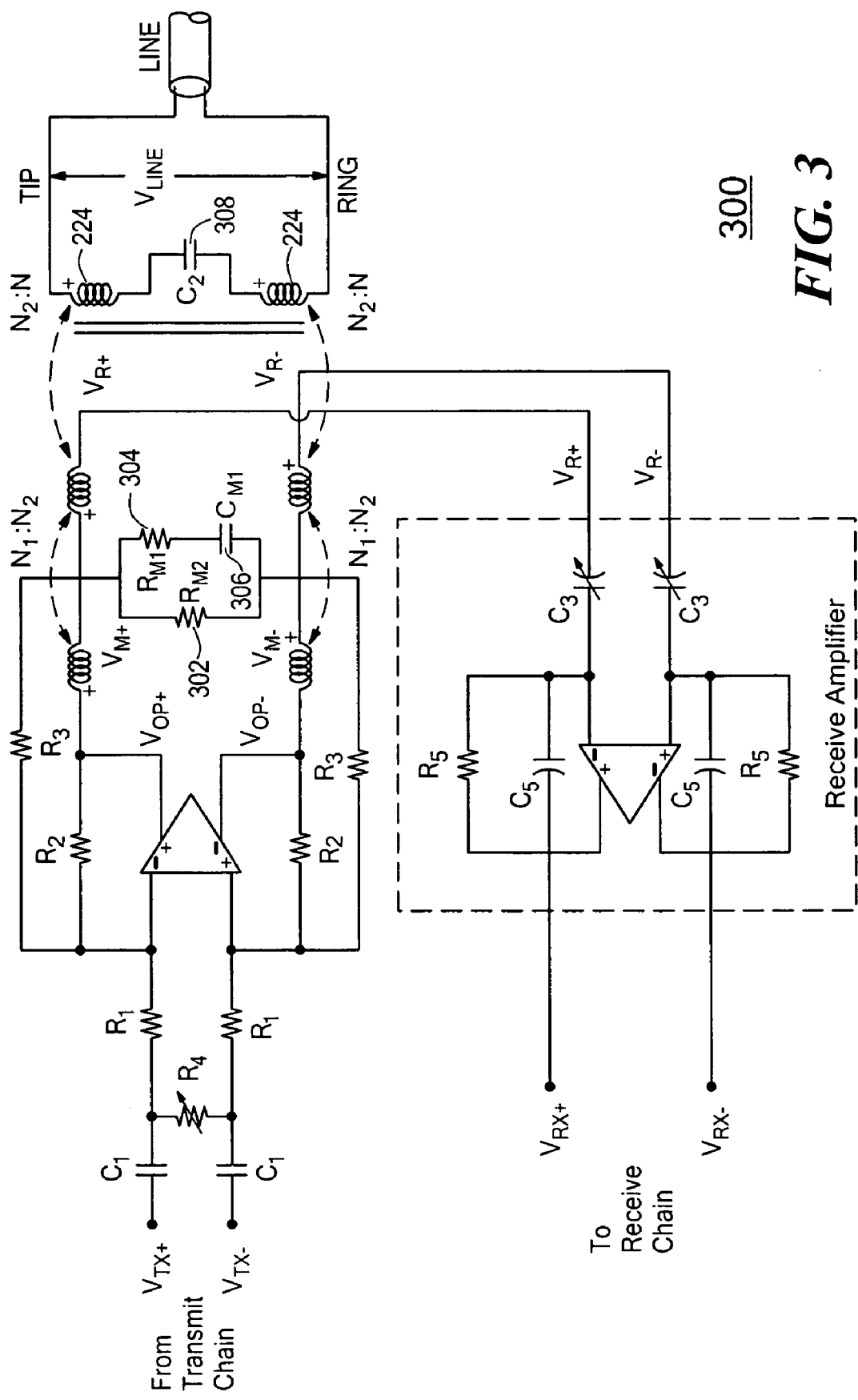
FIG. 3 is a schematic diagram showing an exemplary line interface in accordance with the line interface architecture shown in FIG. 2.

FIG. 3 is a schematic diagram showing an exemplary line interface 300 in accordance with the line interface architecture 200. The line interface 300 illustrates additional details about the implementation of the matching impedance 218 and the receive path filter specifically for an ADSL CO application. The matching impedance 218 includes a resistor 302 (RM2) coupled in parallel to a serially-coupled resistor 304 (RM1) and capacitor 306 (CM1). The transformer secondary includes a capacitor 308 (C2) coupled between the two secondary windings 224.

Figure 4:
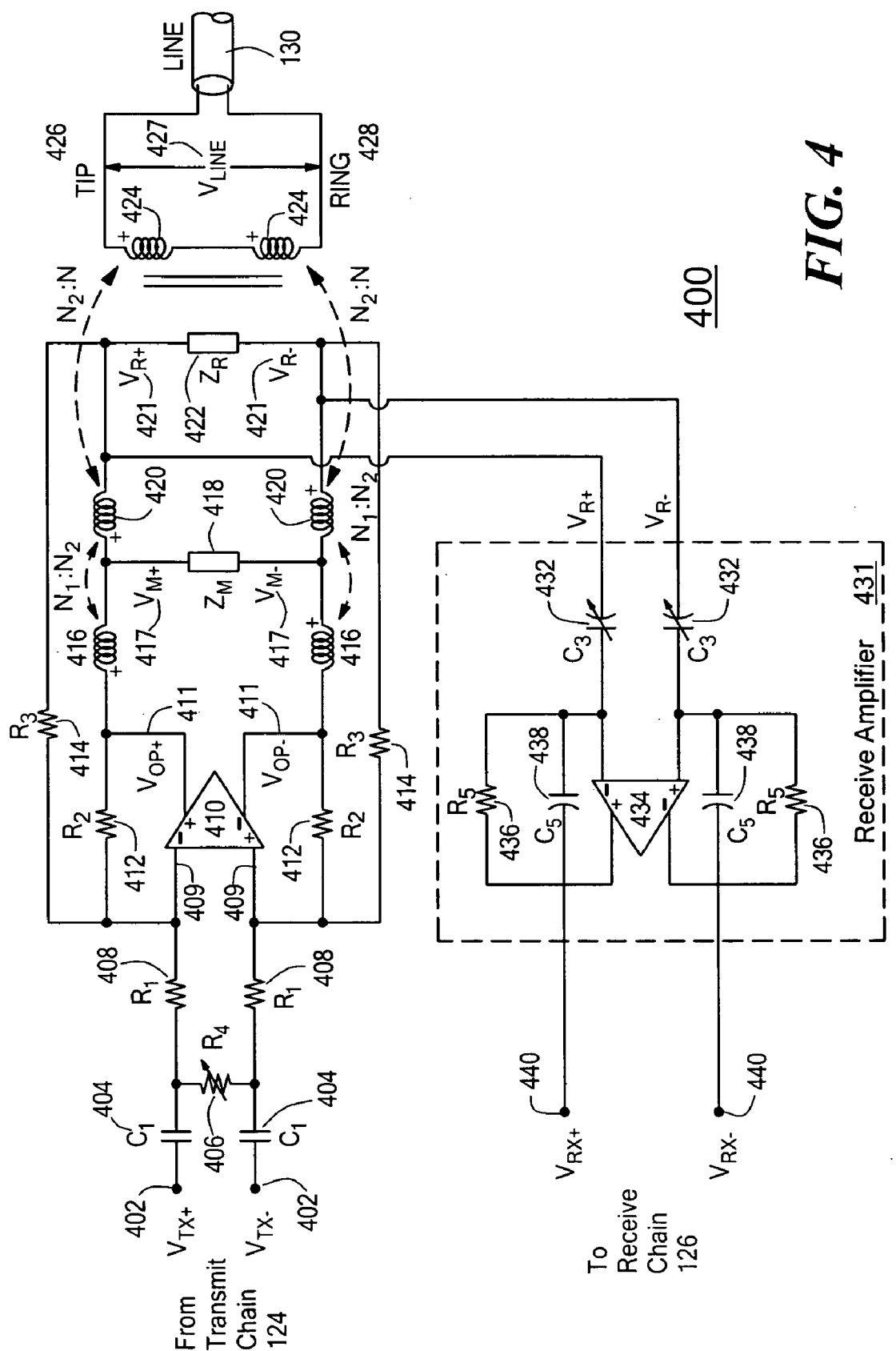
FIG. 4 is a schematic diagram showing an exemplary line interface architecture for an ADSL modem front end in accordance with a second embodiment of the present invention.

FIG. 4 is a schematic diagram showing an exemplary line interface architecture 400 for an ADSL modem front end in accordance with a second embodiment of the present invention. The line interface 400 uses a fully-differential voltage-feedback implementation of a line driver, a single-transformer hybrid, a single matching impedance, and a receive path amplifier. The transformer uses split windings on both the primary side (i.e., the side coupled to the transmitter 124 and the receiver 126) and the secondary side (i.e., the side coupled to the line 130). On the primary side of the transformer, each half of the primary side is tapped to obtain a turns ratio of N1:N2, while each half of the secondary side of the transformer has N windings. A dual negative-feedback network (described below) boosts the small-signal impedance of the matching network 418 (ZM) to a much larger line driver output impedance in order to match the characteristic impedance of the transmission line (ZL). Matched termination of the line improves transmission efficiency for the received signal. While the matching impedance manifests itself significantly larger to the received signal, it appears substantially with its actual value for the transmit signal. As a result, by using a small matching impedance, only a small fraction of the total power is consumed by the matching impedance and an efficient operation is achieved during transmission.

The transmission path includes a pair of capacitors 404 (C1), a variable resistor 406 (R4), and a pair of resistors 408 (R1) in the input path from line interface inputs 402 (VTX) to a transmitter amplifier 410. The outputs 411 (VOP) of the transmitter amplifier 410 are fed back to the inputs 409 through a pair of resistors 412 (R2) to form a first feedback path and are also coupled to the primary side of the transformer, which is split into first primary windings 416 having N1 turns and second primary windings 420 having N2 turns. The matching network 418 is coupled in parallel with the outputs 411 of the transmitter amplifier 410 between the first primary windings 416 and the second primary windings 420. The outputs 411 (VOP) of the amplifier 410 are serially passed through the first primary side transformer windings 416 and the second primary side transformer windings 420, and the voltage across the receive terminals 421 (VR+ and VR−) is bootstrapped through the resistors 414 (R3) around the line driver to form a second feedback path.

Resistors 408 (R1), 412 (R2), and 414 (R3) set the gains from the inputs 402 (VTX) to the outputs 411 (VOP) of the amplifier 410 and also to the voltage 427 (VLINE) across the conductors 426 (TIP) and 428 (RING) of line 130. The received signals 421 (VR+ and VR−) from the line appear across the transformer primary windings 416 (N1) and 420 (N2). In addition, the transmit signal appears across the same windings. When the impedance (ZM) of the matching network 418 is a fraction of the impedance (ZL) of the line 130, the sum of the transmit voltage across the two windings 420 (N2) becomes equal to that across the matching impedance (ZM). This results in a substantially complete rejection of the echo signal when the receive voltage is taken from terminals 421 (VR+ and VR−). Thus, a substantially complete rejection is achieved in the hybrid without the need of extra components that are otherwise needed to perform this function. The capacitors 404 (C1) implement a first-order high-pass filter (HPF) essentially at no additional cost, noise, or power consumption.

The receive path of the line interface consists of a receive amplifier 431 coupled to terminals 421 (VR+ and VR−) of the second primary windings 420. The receive amplifier drives outputs 440 (VRX) and includes a pair of variable capacitors 432 (C3), difference amplifier 434, a pair of resistors 436 (R5), and another pair of capacitors 438 (C5). This is just one example of a receive amplifier. The present invention is not limited to this implementation of a receive amplifier, and other implementations can be used.

For optimal hybrid rejection of the transmit signal echo from the receive path, the matching impedance 218 (ZM) should be:

$$Z_M = \left(\frac{N_1 N_2}{N^2}\right) Z_L \qquad (9)$$

where ZL is the line impedance seen on the conductors 426 (TIP) and 428 (RING). It can be shown that the transmit gain to the line is maximized when Eq. (9) is satisfied. Further, the receive gain from the line is maximized when the receive impedance 422 (ZR) is infinite.

Under these conditions, voltage gain from line driver inputs 402 (VTX) to the transmitter outputs 411 (VOP) can be approximated as:

$$\frac{V_{OP}}{V_{TX}} = -\left(\frac{R_2}{R_1}\right) \qquad (10)$$

Voltage gain from line driver input to line can be approximated as:

$$\frac{V_{LINE}}{V_{TX}} = \left(\frac{N}{N_1 + N_2}\right)\frac{V_{OP}}{V_{TX}} \qquad (11)$$

Receive path gain can be approximated as:

$$\frac{V_R}{V_{LINE}} = \frac{-\left(\frac{2N_2}{N}\right)}{\left[1 + \frac{N_2(N_1 + N_2)}{N^2}\left(\frac{Z_L}{R_3}\right)\right]} \qquad (12)$$

Output impedance of the line driver seen from the line can be approximated as:

$$Z_l = \frac{N^2\left(1 + \frac{R_2}{R_3}\right)}{\left\{\frac{(N_1 + N_2)^2}{R_3} + \left(\frac{N_1 N_2}{Z_M}\right)\left[\left(\frac{N_1}{N_2}\right) - \left(\frac{R_2}{R_3}\right)\right]\right\}} \qquad (13)$$

In order to match the output impedance of the line driver (expressed by Eq. (13)) to the line characteristic impedance (ZL), the following condition should be met:

$$\frac{R_2}{R_3} = \frac{1}{2}\left[\left(\frac{N_1 + N_2}{N}\right)^2\left(\frac{Z_L}{R_3}\right) + \left(\frac{N_1}{N_2}\right) - 1\right] \qquad (14)$$

The power saving factor k (i.e., the ratio of the matching impedance to the line characteristic impedance) can be estimated as:

$$k = Z_M / Z_L = \frac{N_1 N_2}{N^2} \qquad (15)$$

where ZL is the total line impedance as seen from the secondary side of the transformer. In the above equation, N represents the number of turns of each secondary as shown in FIG. 4. The impedance of the matching network is preferably optimized to match the characteristic impedance of the line times a scaling factor as shown in Eq. (15) above.

Figure 5:
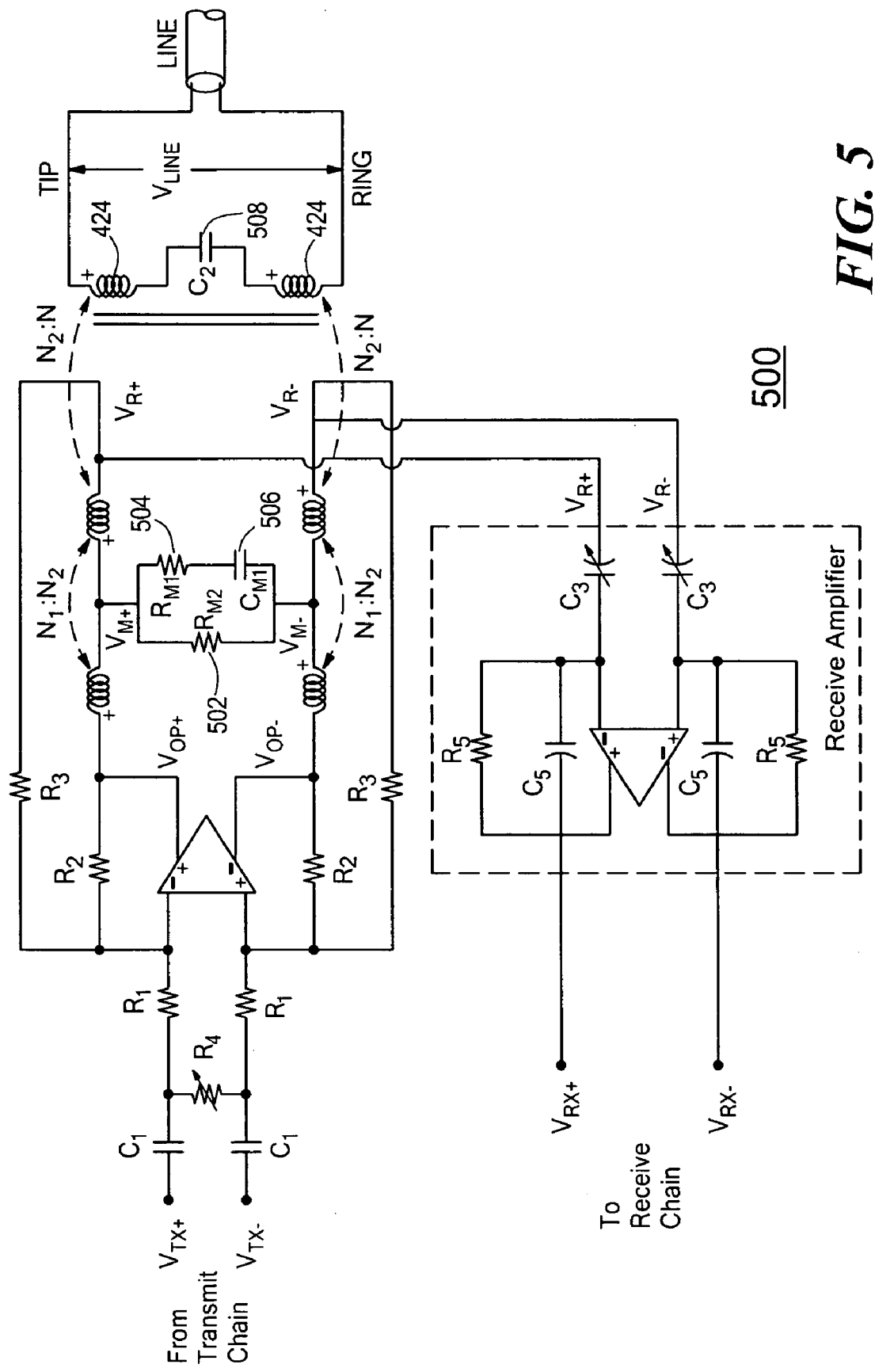
FIG. 5 is a schematic diagram showing an exemplary line interface in accordance with the line interface architecture shown in FIG. 4.

FIG. 5 is a schematic diagram showing an exemplary line interface 500 in accordance with the line interface architecture 400. The line interface 500 illustrates additional details about the implementation of the matching impedance 418 and the receive path filter specifically for an ADSL CO application. The matching impedance 418 includes a resistor 502 (RM2) coupled in parallel to a serially-coupled resistor 504 (RM1) and capacitor 506 (CM1). The transformer secondary includes a capacitor 508 (C2) coupled between the two secondary windings 424.

One advantage of the line interface architecture 400 shown and described with reference to FIG. 4 above is that the transmit and the receive voltages can be largely separated under certain conditions. Thus, it has the potential of tuning and the realization of an adaptive hybrid. Referring to FIG. 4, when:

$$Z_M = \left(\frac{N_1 N_2}{N^2}\right) Z_L$$

the transmit voltage across the terminals 417 (VM+ and VM−) is:

$$-\left(\frac{R_2}{R_1}\right)\left(\frac{N_2}{N_1 + N_2}\right) V_{TX}$$

(a known factor of VTX), while that across the receive terminals 421 (VR+ and VR−) is zero. Further, it can be shown that when:

$$\frac{R_2}{R_3} = \frac{N_1}{N_2}$$

and when:

$$(Z_R \| R_3) = \frac{N_2(N_1 + N_2)}{N^2} Z_L = \left(1 + \frac{N_2}{N_1}\right) Z_M$$

the receive voltage VR across the terminals 417 (VM+ and VM−) is zero while that across the terminals 421 (VR+ and VR−) is:

$$V_R = -\left(\frac{N_2}{N}\right) V_{LINE}.$$

Thus, the voltage across the matching impedance terminals 417 (VM+ and VM−) can be sensed and compared with a previously known factor of VTX. Then, the error voltage can be used to simultaneously tune the resistors and capacitors in impedances ZM and (ZR∥R3), which are related to one another by:

$$(Z_R \| R_3) = \left(1 + \frac{N_2}{N_1}\right) Z_M$$

until the error voltage is zero.

In summary, the architectures disclosed achieve better performance in terms of hybrid rejection, transmit gain, receive gain, input-referred noise to tip/ring, and return loss as compared to other architectures.

The present invention may be embodied in other specific forms without departing from the true scope of the invention. The described embodiments are to be considered in all respects only as illustrative and not restrictive.

What is claimed is:

1. A line interface for use in a transceiver system, the line interface comprising a hybrid circuit including a single transformer and a single matching circuit, the transformer couplable on a primary side to a transmit amplifier and to a receive amplifier and couplable on a secondary side to a communication medium, each side of the transformer having split windings, each half of the primary side further split into a first winding having a first number of turns and a second winding having a second number of turns, the first winding and the second winding coupled in series on each half of the primary side, the single matching circuit having a matching impedance less than a line impedance and coupled in parallel between the first windings and the second windings on each half of the primary side, the line interface further comprising a multiple negative-feedback network for causing the matching impedance to appear larger than its actual value as seen by the communication medium on the secondary side and to appear with its actual value at the output of the transmit amplifier.

2. A line interface according to claim 1, wherein the matching circuit comprises a first resistor coupled in parallel with a second resistor and a capacitor coupled serially.

3. A line interface according to claim 1, wherein a voltage across the matching impedance is bootstrapped to a receive signal through the multiple negative-feedback network.

4. A line interface according to claim 1, wherein the transformer includes receive terminals, and wherein the receive terminals are bootstrapped to the receive signal through the multiple negative-feedback network.

5. A line interface according to claim 1, wherein the multiple negative-feedback network is a dual negative-feedback network.

6. A line interface according to claim 5, wherein the dual negative-feedback network includes:
   a first feedback loop in which the outputs of the transmit amplifier are fed back to the inputs of the transmit amplifier through a first pair of resistors; and
   a second feedback loop in which one of (a) a voltage across the matching impedance and (b) a voltage across receive terminals of the transformer is bootstrapped through a second pair of resistors around the transmit amplifier.

7. A line interface according to claim 1, wherein the matching impedance (ZM) is substantially equal to:

$$Z_M = \left(\frac{N_1 N_2}{N^2}\right) Z_L$$

where ZL is the line impedance, N1 is the first number of turns on the first primary side windings, N2 is the second number of turns on the second primary side windings, and N is the number of turns on each half of the secondary side windings.

8. A line interface according to claim 1, wherein the transmit amplifier includes differential inputs.

9. A line interface according to claim 8, wherein each of the differential inputs includes a high-pass filtering capacitor.

10. A line interface according to claim 1, wherein the receive amplifier includes differential inputs.

11. A transceiver system for use in a communication device, the transceiver system comprising:
   a transmit circuit including a transmit amplifier having differential inputs and differential outputs;
   a receive circuit including a receive amplifier having differential inputs and differential outputs; and
   a hybrid circuit coupled to the differential outputs of the transmit circuit and to the differential inputs of the receive circuit, the hybrid circuit including a single transformer and a single matching circuit, the transformer coupled on a primary side to the differential outputs of the transmit amplifier and to the differential inputs of the receive amplifier and coupled on a secondary side to a communication medium, each side of the transformer having split windings, each half of the primary side further split into a first winding having a first number of turns and a second winding having a second number of turns, the first winding and the second winding coupled in series on each half of the primary side, the single matching circuit having a matching impedance less than a line impedance and coupled in parallel between the first windings and the second windings on each half of the primary side, the transceiver system further comprising a multiple negative-feedback network for causing the matching impedance to appear larger than its actual value as seen by the communication medium on the secondary side and to appear with its actual value at the output of the transmit amplifier.

12. A transceiver system according to claim 11, wherein the matching circuit comprises a first resistor coupled in parallel with a second resistor and a capacitor coupled serially.

13. A transceiver system according to claim 11, wherein a voltage across the matching impedance is bootstrapped to a receive signal through the multiple negative-feedback network.

14. A transceiver system according to claim 11, wherein the transformer includes receive terminals, and wherein the receive terminals are bootstrapped to the receive signal through the multiple negative-feedback network.

15. A transceiver system according to claim 11, wherein the multiple negative-feedback network is a dual negative-feedback network.

16. A transceiver system according to claim 15, wherein the dual negative-feedback network includes:
   a first feedback loop in which the outputs of the transmit amplifier are fed back to the inputs of the transmit amplifier through a first pair of resistors; and
   a second feedback loop in which one of (a) a voltage across the matching impedance and (b) a voltage across receive terminals of the transformer is bootstrapped through a second pair of resistors around the transmit amplifier.

17. A transceiver system according to claim 11, wherein the matching impedance ($Z_M$) is substantially equal to:

$$Z_M = \left(\frac{N_1 N_2}{N^2}\right) Z_L$$

where ZL is the line impedance, N1 is the first number of turns on the first primary side windings, N2 is the second number of turns on the second primary side windings, and N is the number of turns on each half of the secondary side windings.

18. A transceiver system according to claim 11, wherein each of the differential inputs of the transmit amplifier includes a high-pass filtering capacitor.

* * * * *